United States Patent [19]

Ignagni

[11] Patent Number: 5,834,623
[45] Date of Patent: Nov. 10, 1998

[54] APPARATUS AND METHOD TO PROVIDE HIGH ACCURACY CALIBRATION OF MACHINE TOOLS

[76] Inventor: Mario B. Ignagni, 1599 Chatham Ave., Arden Hills, Minn. 55112

[21] Appl. No.: 398,480

[22] Filed: Mar. 3, 1995

[51] Int. Cl.$^6$ ........................................ G05B 19/42
[52] U.S. Cl. ........................................ 73/1 E; 33/502
[58] Field of Search ........................ 73/1 E, 1 D; 33/502; 83/74

[56] References Cited

U.S. PATENT DOCUMENTS

| | | | |
|---|---|---|---|
| 5,239,855 | 8/1993 | Schleifer et al. | 73/1 D |
| 5,301,114 | 4/1994 | Mitchell | 73/1 E |

FOREIGN PATENT DOCUMENTS

| | | |
|---|---|---|
| A0411139 | 2/1991 | European Pat. Off. . |
| A0416258 | 3/1991 | European Pat. Off. . |
| A0545658 | 6/1993 | European Pat. Off. . |

*Primary Examiner*—Robert Raevis
*Attorney, Agent, or Firm*—Thomas A. Rendos

[57] ABSTRACT

A sensor assembly along with numerous processing equipment is provided for attachment to the work table of a precision machining system. By attaching the device to the work table and subsequently driving the work table through a repeated pattern of motions, the actual movement of the table can be precisely determined and, consequently, can be compensated for. The sensor assembly utilizes a plurality of gyroscopes and accelerometers to determine actual movement in inertial space.

23 Claims, 7 Drawing Sheets

Figure 1 MACHINE TOOL CALIBRATION CONCEPT

APPARATUS AND METHOD TO PROVIDE HIGH ACCURACY CALIBRATION OF MACHINE TOOLS

BACKGROUND

FIELD OF INVENTION

The present invention relates generally to high precision machine tools. More specifically, the present invention provides a system for periodic calibration of the angular errors in a numerically controlled machine tool.

BACKGROUND OF THE INVENTION

The availability of contemporary numerically controlled machine tools has increased the potential accuracy of machining operations in many industrial applications. To realize the full accuracy potential of a given machine, however, it is required that the quasi-static errors originating from loading conditions and track wear be calibrated and compensated for. The geometric relationships of the tracks and the guideways to the machine base determine the accuracy of the machine. Lack of straightness, orthogonality, and track pitch, roll, and yaw deviations, need to be initially calibrated, and periodically recalibrated over the lifetime of the machine, to insure its maximum accuracy.

In contemporary numerically controlled machine tools a work table is generally used in combination with a cutting tool. The cutting tool will generally move along a single axis (typically a vertical axis) while the work table, upon which a work piece is mounted will generally move horizontally relative to the cutting tool in order to machine the work piece as desired. In order to obtain high precision machining, the movements of the work table and cutting tool must be very precisely controlled. Furthermore, in order to provide very diverse machining capabilities it is necessary for the work table to move along two or possibly three orthogonal axes.

In order to achieve appropriate movement of the work table, the table is generally mounted on tracks and has associated therewith numerous motors or other devices capable of driving the work table. Over time, quasi static errors are generated in the control of the work table. These errors can be generated from numerous sources including wear of the table mechanisms over time, stress induced into the systems, misalignment over time, and other load induced and thermally induced errors. As a consequence of all of these errors, angular errors develop in each of the movement axes.

As a result of all of the above mentioned errors, it is necessary to periodically calibrate the work table movement to assure precision machining capabilities. This calibration has been conventionally done using a series of instruments including autocolimators, optical straight edges, tilt meters, etc. Due to the large number of different devices traditionally used and the complexity of these devices, this calibration process is generally very time consuming and very expensive. As will be appreciated this time and expense has a negative impact on the business operations of a machining shop. Consequently it is necessary to develop a simpler and less costly method of providing periodic calibration of these machine tools.

In the field of avionics, there has always been a need to track the motions and movement of devices in inertial space. More specifically aircraft and spacecraft need to be tracked in order to maintain a current assessment of their position and orientation in inertial space. This information is then used by navigation systems and auto pilots to control the aircraft as well as numerous other systems to provide aircraft operability enhancement. As is recognized in the avionics field, these inertial navigation systems provide a highly precise measurement of position and orientation in inertial space.

Generally inertial navigation systems or inertial reference systems require the use of gyroscopes and accelerometers to track the motion of such systems. One type of gyroscope is the ring laser gyroscope as explained in U.S. Pat. No. 3,373,650 to Killpatrick, et al which is assigned to the assignee of the present invention.

SUMMARY OF INVENTION

The present invention uses all of the previously established capabilities of inertial reference systems to provide solutions to some of the known problems and needs regarding precision machining. The present invention utilizes a sensor assembly which is mounted to the movable member of a machine tool to provide information regarding angular errors. Data is taken from the sensor assembly as it travels through a repeated pattern of motion on the movable member, thus allowing its actual movement to be characterized. This data is fed into a processing system to process all of the information from the sensor assembly regarding the precise angular movements of the movable member. Also provided to the processing unit is an indication of the member's position which is provided by position sensors mounted to the movable member. By collecting this data over numerous predetermined movements of the movable member, any irregularities can thus be determined. As recognized once these irregularities are determined, they can be used to compensate the precision control system which controls the movements of the member during the machining operation.

The use of inertial sensors offers some important advantages: (1) the calibration procedure is automated; (2) calibration of track pitch, roll, and yaw angular deviations, and spindle to track angular deviations, is possible with greater efficiency and accuracy; (3) the ease of use, and speed of the inertial measurement technique, make it feasible to easily recalibrate the machine in the user's environment.

It is an object of the present invention to provide a high precision system utilizing ring laser gyroscopes and other inertial sensors to measure the movements of the movable member in a precision machining tool. It is a further object of the invention to provide algorithms for high precision characterization of the angular error in these movements and consequently allow for machine compensation.

It is another object of the present invention to provide a calibration methodology, including appropriate algorithms, to provide automated calibration of a precision machine tool.

It is a further object of the present invention to provide an automated system which will perform all of the data acquisition and computation functions without requiring heavy user involvement.

BRIEF DESCRIPTION OF THE DRAWINGS

Further objects and advantages of the present invention can be seen by reading the following detailed description in conjunction with the drawings in which.

DETAILED DESCRIPTION OF THE INVENTION

The capability to do precision machining depends on being able to compensate for the irregularities in each machine axis. Normally five parameters are used to characterize the deviations in each of the machine's axes (pitch, roll, yaw angular deviations; two cross-axis linear deviations) and, in addition, six parameters to characterize the orthogonality errors between the three machine axes—leading to a total of 21 parameters to be calibrated. In the present invention, an inertial sensor assembly is utilized in the determination of a subset of these 21 machine tool errors, which are the pitch, roll, and yaw angular errors in each axis.

Figure 1:
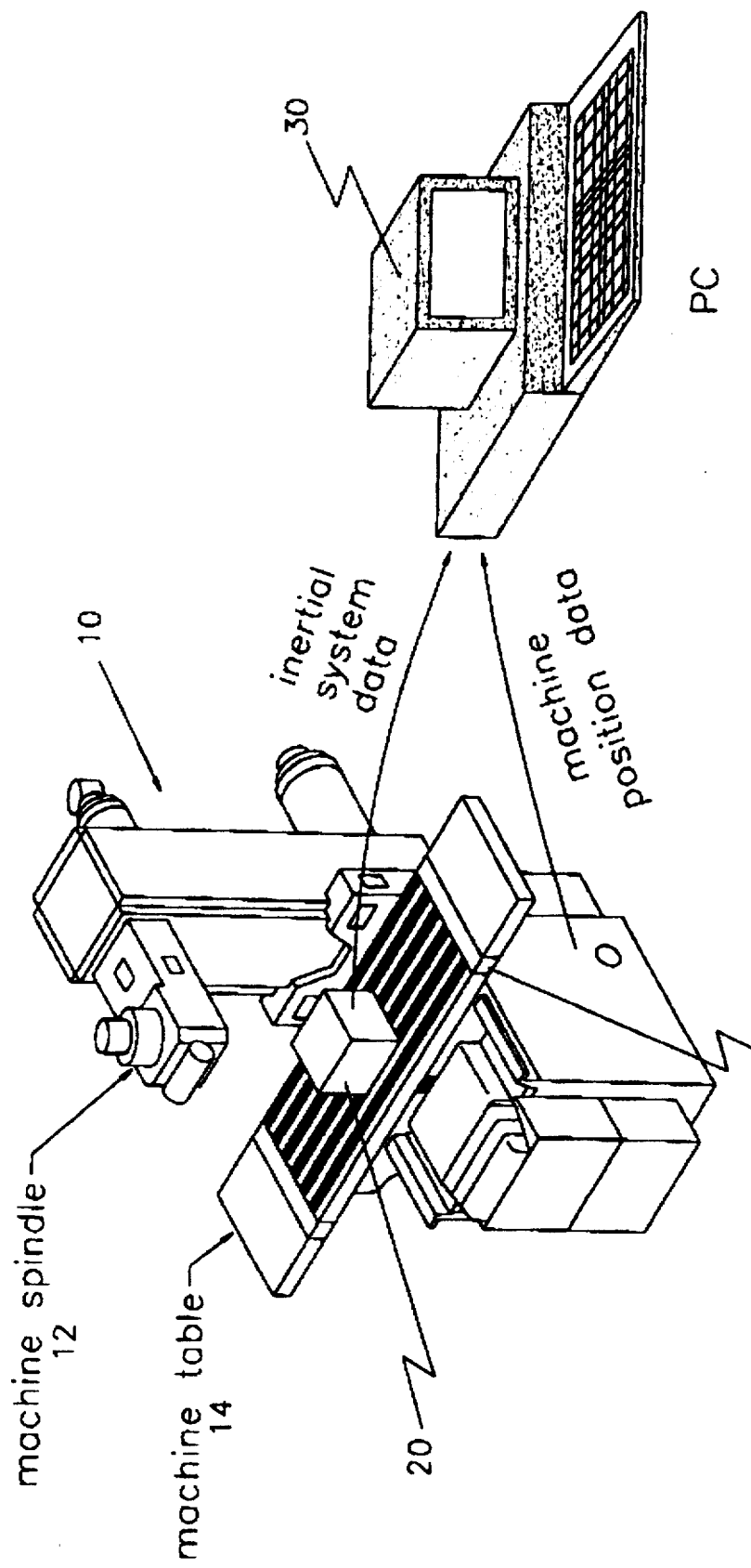
FIG. 1 is a schematic of the concept which illustrates the principal elements in the invention.

A device for precision measurements of the angular errors in each axis of a machine tool is illustrated in FIG. 1. FIG. 1 depicts a numerically controlled machine tool 10 having a spindle 12 which moves in a vertical direction, and a movable member or table 14 which moves in two orthogonal horizontal directions. Both spindle 12 and table 14 movements are effected by irregularities that cause angular errors in the orientation of these members. These irregularities are a function of the axis position relative to a reference starting point and are characterized by pitch, roll, and yaw components. The function of the calibration technique of the present invention is to measure the machine pitch, roll, and yaw angular errors using an inertial sensor assembly.

As illustrated in FIG. 1, the basic concept is to collect data from an inertial sensor assembly 20, and a machine position encoder 16, over a complete traversal of a given axis of the machine. This information is used to derive the angular deviations of that axis. In the present embodiment, inertial sensor assembly 20 includes a triad of gyros 21 orthogonally orientated. Gyro data is collected simultaneously with the machine position data and stored in a processor or PC 30. Processing of the gyro and machine position data provides an estimate of the angular deviations (pitch, roll, yaw) of the particular axis as a function of the position along the axis of measurement. By repeating this back and forth traversal, and averaging the results, a composite result is obtained that represents the best estimate of the machine's angular deviations.

Figure 2:
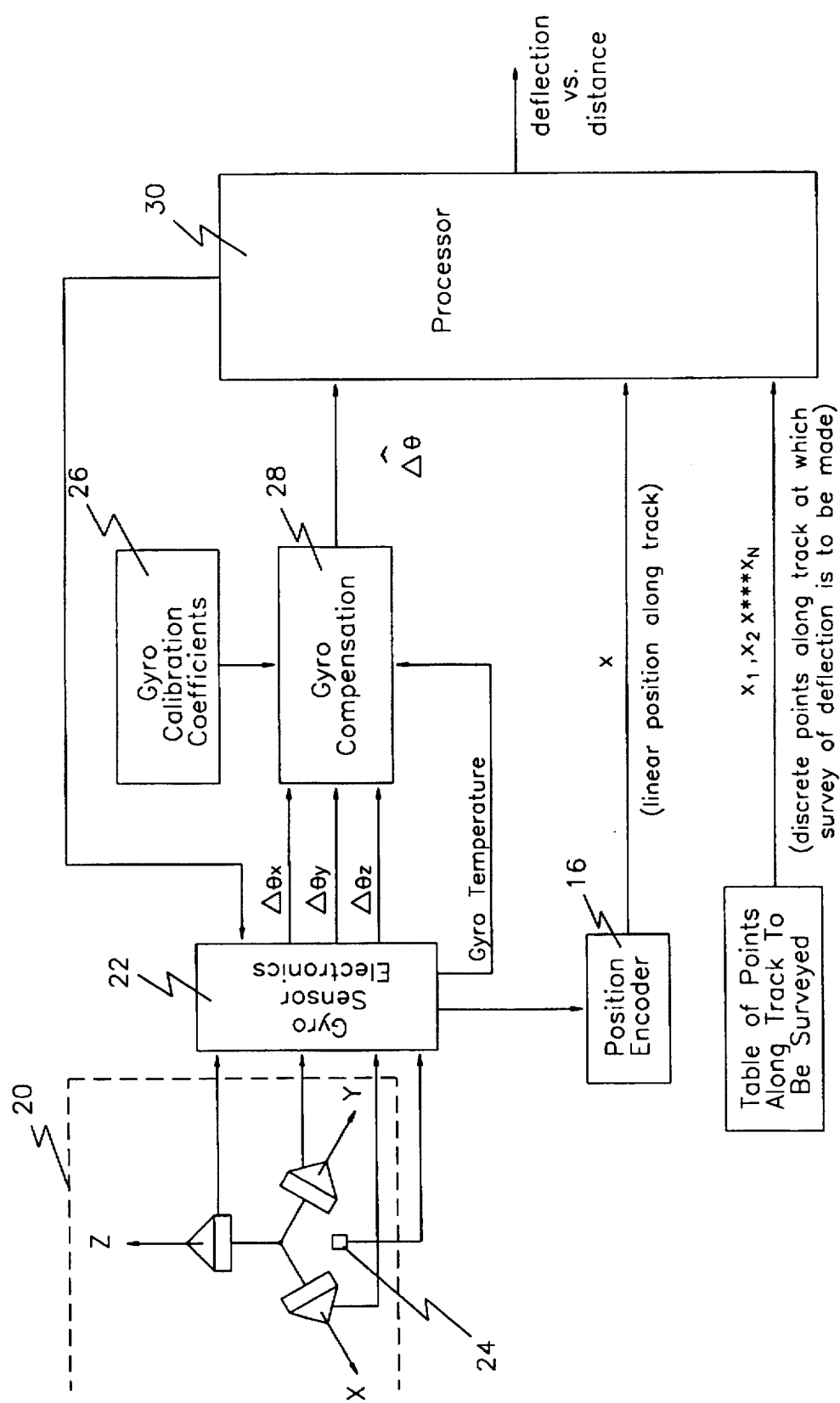
FIG. 2 is a diagram illustrating the source and method of processing the three informational sources to arrive at the machine angular deviations as a function of the distance along each of its tracks.

Further details of the calibration apparatus and technique are shown in FIG. 2. Here it is seen that the sensor assembly 20 is interogated by the sensor electronics 22, which also interogates the internal temperature sensors 24. This allows the gyro incremental outputs to be corrected for temperature effects using a set of gyro compensation coefficients, as provided by gyro calibration coefficient apparatus 26. Gyro compensation apparatus 28 receives the coefficients from gyro calibration coefficient apparatus 26 to produce the compensated gyro incremental angle vector $\Delta\theta$. The machine position along its track, x, is measured simultaneously by sending an interogation pulse from sensor electronics 22 to machine encoder 16. This provides all of the data needed to calibrate the machine angular errors at a series of equally spaced points ($x_1 \ldots x_N$) along the track specified by the user.

Figure 3:
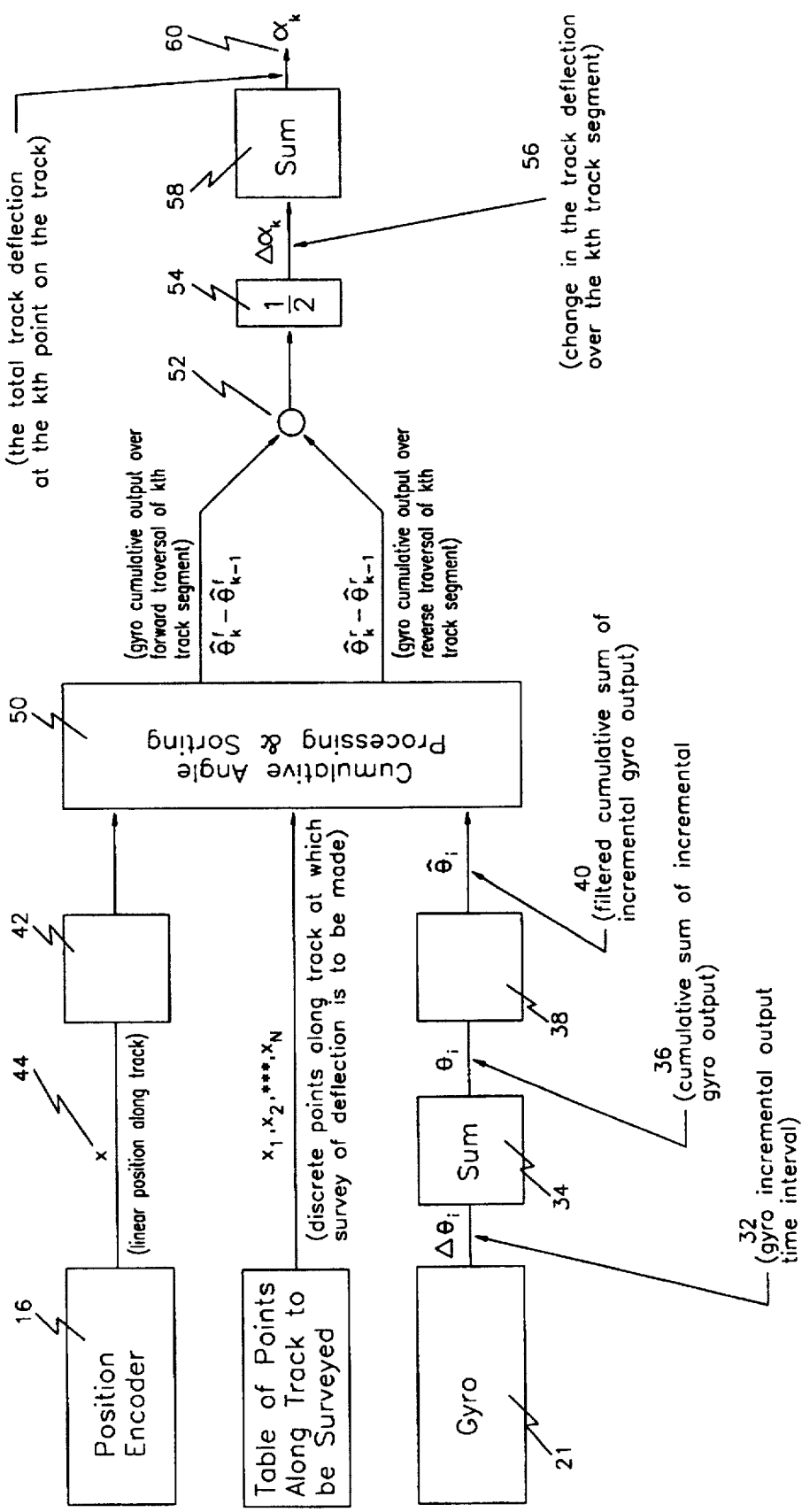
FIG. 3 is a block diagram that illustrates the algorithmic approach used in converting the three informational sources into an angular deviation function.

A block diagram illustrating the basic features of the processing algorithm carried out by processor 30 is shown in FIG. 3. It should be noted that, only a single axis is represented in the diagram. Consequently, identical processes will be carried out for each axis of measurement.

The diagram illustrates a number of basic functions as follows:

1. Gyro 21 as its output incremental measured over an $i^{th}$ time interval to produce a gyro incremental output 32. ($\Delta\theta_i$) This Output 32 is summed by summing apparatus 34 with all previously occurring incremental angles obtained from gyro 16, to form a cumulative angle $\theta_i$ 36 at the $i^{th}$ time point.

2. The cumulative angle, $\theta_i$, is filtered by a first filtering apparatus 38. This filter 38 could be a low-pass filter of first or second order, or possibly two or more such filters cascaded together. The filtering operation produces the filtered cumulative gyro output, $\hat{\theta}_i$ 40, at the $i^{th}$ time point. The purpose of the filtering operation is to attenuate random contributions to the cumulative gyro output originating from quantization and other random errors in the gyro incremental output.

3. The machine position measurement, x, 44 is synchronized with the gyro data, so that the machine position corresponds to the end of the $i^{th}$ time interval. The sequence of machine position measurements is filtered by a second filtering apparatus 42. Second filter 42 is matched to first Filter 38, so that whatever filter transfer function is selected for one also applies to the other. The reason for matching the two filters is so both the gyro data and the machine position data remain synchronous. This will be true only if the filters are matched; otherwise, the two signals will become time shifted relative to one another in proportion to the time constant of the filter. The output of second filter 42 is then a filtered machine position 46.

4. The filtered cumulative gyro output 40 and filtered machine position measurement 46 are processed by the block designated "Cumulative Angle Processing and Sorting" 50. This operation breaks up the stream of cumulative gyro data and sorts it according to a predetermined segment of the track. Since the filtered cumulative gyro output occurs at a fixed spacing in time, and the filtered position output 46, an interpolation process is required to derive the desired result. After interpolation, the filtered cumulative gyro output is known for each of the predetermined positions, $x_k$, at which the angular errors are to be determined. This is done for both the forward and reverse directions of travel, leading to the filtered cumulative angle, $\hat{\theta}_k^f$, when the machine occupied the $k^{th}$ track position in the forward direction, and the filtered cumulative angle, $\hat{\theta}_k^r$, when the machine occupied the same position on the track when travelling in the reverse direction.

5. The change in the filtered cumulative gyro output from the $(k-1)^{th}$ point on the track to the $k^{th}$ point on the track is determined for both the forward and reverse directions of travel, and differenced at summing point 52. By doing so, the effect of the fixed (and generally unknown) component in the gyro output arising from gyro bias and earth rate is eliminated. At the same time, the component in the gyro output that is responsive to the change in the track angular deflection over a given track segment is reinforced (doubled). Therefore, by multiplying the difference by ½ in block 54, the change in the track angular deviation, $\Delta\alpha_k$ 56, over the $k^{th}$ track segment is obtained.

6. A final summing operation at block 58 leads to the cumulative track deflection change, $\alpha_k$ 60, from the start of the track to its end, as a function of the track position.

The processing scheme defined above takes advantage of a knowledge of what the gyro measures as it travels down the track of a machine. The incremental gyro output over some arbitrary interval of time consists of the sum of following components:

- A fixed component due to gyro bias and the earth rate component measured by the gyro, which is constant given that the gyro orientation is fixed relative to the earth's rotational rate vector—which will always be true for a nominally straight machine track.
- A random component due to gyro quantization, gyro random walk, small extraneous motions of the gyro due to holding fixture to track angular motions, and extraneous machine high frequency angular motions that are superimposed on the angular motions due to track irregularities.
- The desired angular motions resulting from track irregularities, which are a function of the local track curvature.

The filtering applied to the cumulative gyro output is designed to severely attenuate the random components in the gyro output, while the combining of the forward and reverse cumulative angle changes is designed to eliminate the fixed (unknown) component in the gyro output. This leaves just the component that is responsive to the local track curvature, to which the track angular deviation is directly equal.

The basis for the processing scheme may be derived mathematically in the following manner. The incremental gyro filtered cumulative output over any given track interval may be expressed as follows:

$$\theta_k^f - \theta_{k-1}^f = \Delta\alpha_k + \Omega(t_k^f - t_{k-1}^f) + \xi_k^f \quad (1)$$

$$\theta_k^r - \theta_{k-1}^r = -\Delta\alpha_k + \Omega(t_k^r - t_{k-1}^r) + \xi_k^r \quad (2)$$

where:

$\theta_k^f$=gyro filtered cumulative output at forward crossing of $k^{th}$ point on track $\theta_k^r$=gyro filtered cumulative output at reverse crossing of $k^{th}$ point on track $\Delta\alpha_k$=angle change due to track curvature over $k^{th}$ track segment $\xi_k^f$=random error in filtered gyro output over forward traversal of $k^{th}$ track segment $\xi_k^r$=random error in filtered gyro output over reverse traversal of $k^{th}$ track segment $t_k^f$=time associated with reaching the end of $k^{th}$ track segment in forward direction $t_k^r$=time associated with reaching the end of $k^{th}$ track segment in reverse direction $\Omega$=constant angular rate measured by gyro (earth rate plus gyro bias) and the angle change change due to track curvature is given by $$\Delta\alpha_k = \frac{x_k - x_{k-1}}{\rho_k} \quad (3)$$

where $\rho_k$=radius of curvature of track over the $k^{th}$ track segment $x_k$=distance from start point of track to the end of the $k^{th}$ track segment As seen from (3), the angle change due to track curvature, $\Delta\alpha_k$, manifests itself positively when the motion is in a forward direction through the $k^{th}$ track segment, and negatively when the motion is in the reverse direction through the same segment of the track. Therefore, this angle may be obtained by subtracting the forward and reverse cumulative angle differences, as defined above, and dividing by ½ or, explicitly $$\Delta\alpha_k = \frac{1}{2}[(\theta_k^f - \theta_{k-1}^f) - (\theta_k^r - \theta_{k-1}^r)] \quad (4)$$

The total angular deviation of the track relative to its reference starting point is determined by accumulating all of the track curvature changes as defined by (4) or, explicitly $$\alpha_k = \alpha_{k-1} + \Delta\alpha_k \quad (k=1,\ldots,N) \quad (5)$$

where $\alpha_k$ is the total track angular deviation at the $k^{th}$ point on the track. Equations of the form given by (5) define the three angular errors (pitch, roll, and yaw) for each machine axis, with each of the three gyros providing the necessary information to derive one of the three angular errors.

It should be noted from (1), (2) and (4) that the effect of the unknown angular rate, $\Omega$, due to earth rate and gyro bias, will cancel out over the forward and reverse traversals of each segment of the track only if the following condition holds true.

$$t_k^f - t_{k-1}^f = t_k^r - t_{k-1}^r \quad (6)$$

Figure 4:
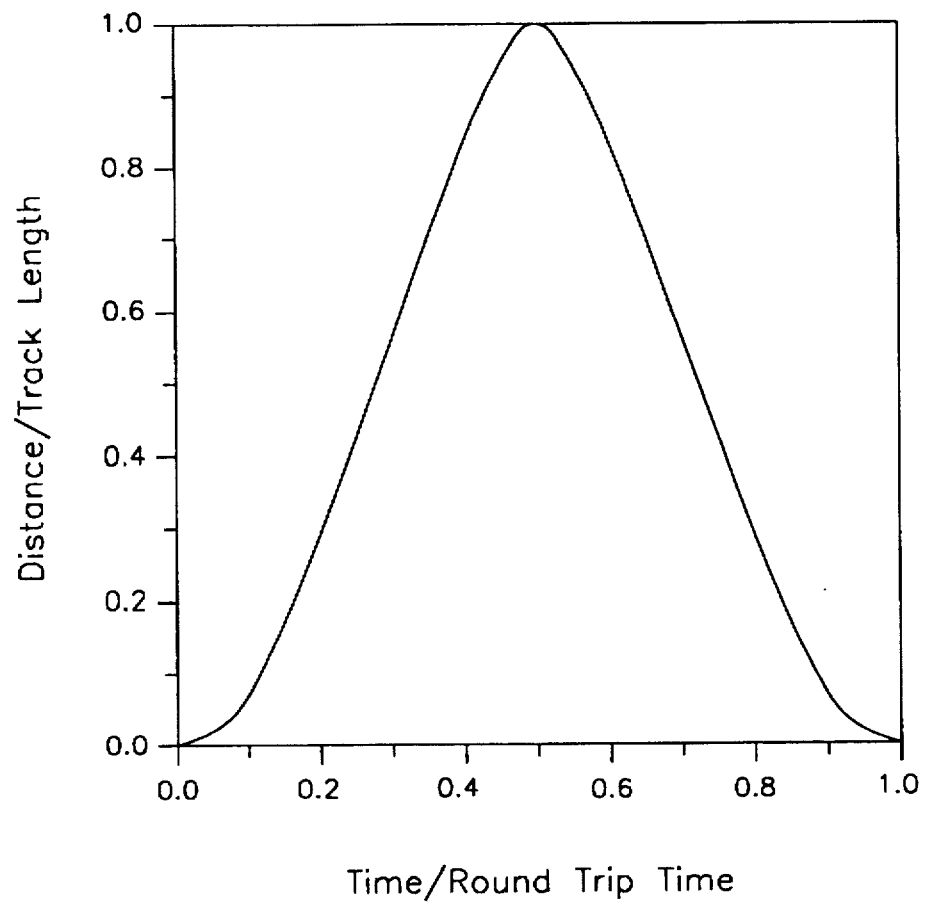
FIG. 4 is a curve that illustrates the unique type of symmetry required in the movement of an axis during the repeated machine traversals executed in the calibration process.

The condition stated in (6) will in turn be satisfied only if the machine's motion along the track has a symmetrical characteristic, as depicted in FIG. 4. This type of machine motion, which is symmetrical about the end point of the track, may be easily commanded by the numerical controller.

Figure 5:
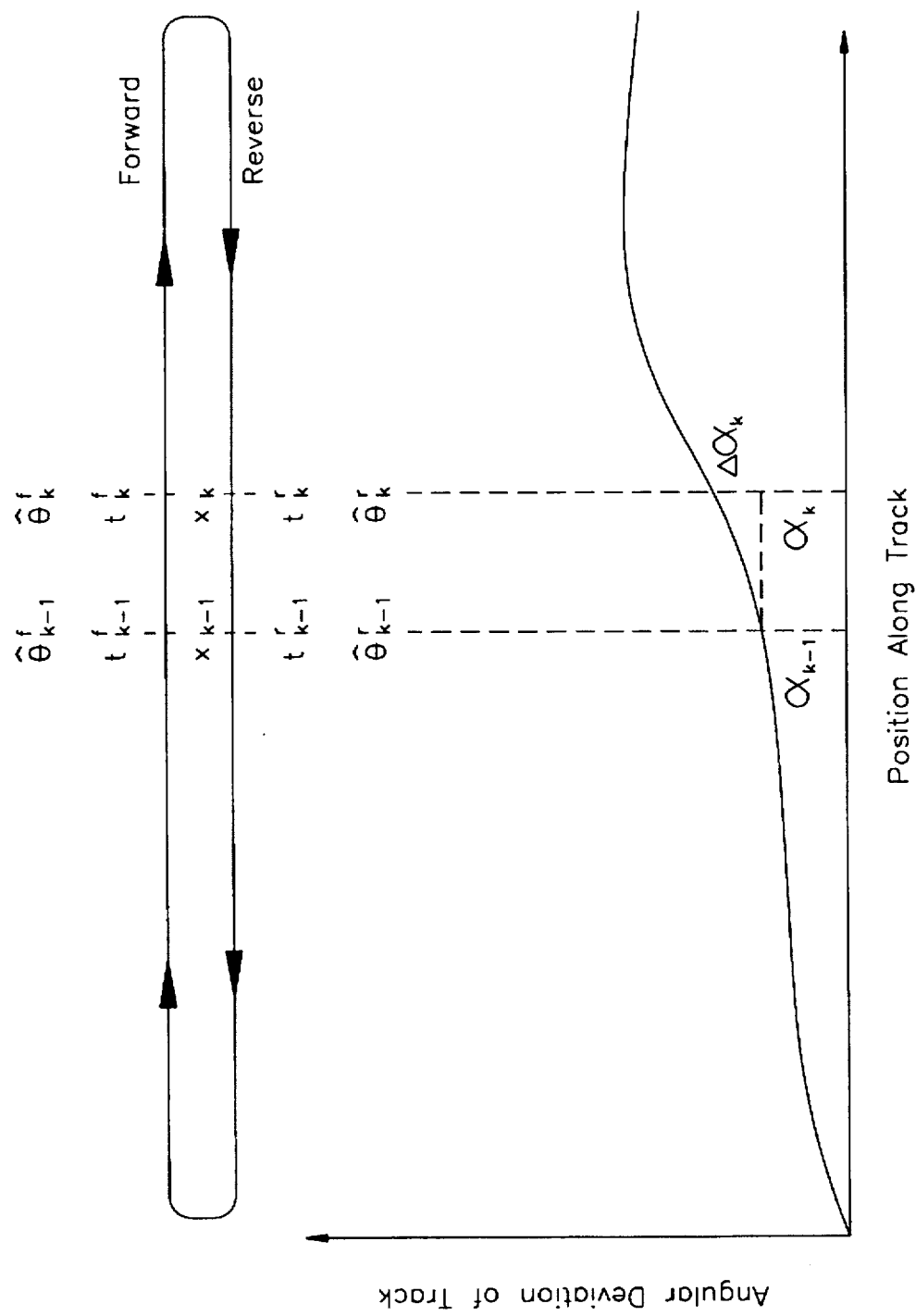
FIG. 5 is a graphical illustration used in the derivation of the incremental and total angular deviations of a given machine axis.

The basic relationship that is used in estimating the track angular deviation from a single traversal is illustrated graphically in FIG. 5. The single-traversal estimate may be significantly improved upon by processing M such sets of results, and averaging or, explicitly $$\hat{\alpha}_k = \frac{1}{M} \sum_{i=1}^{M} \alpha_k^{(i)} \quad (7)$$

where $\hat{\alpha}_k$ is the best estimate after M traversals, and $\hat{\alpha}_k^{(i)}$ is the angular error at the $k^{th}$ point on the track for the $i^{th}$ traversal.

The above derivation assumes that the effect of the track curvature, $\Delta\alpha_k$, is the same in both the forward and reverse direction for each segment of the track. This is not always true for all machines and, more generally, a slightly different value will be experienced when the machine is moving in the forward direction then when moving in the reverse direction. Given that this is true, the processing scheme represented by Equations (1) through (5) leads to what is referred to as the "average angular deviation".

Figure 6:
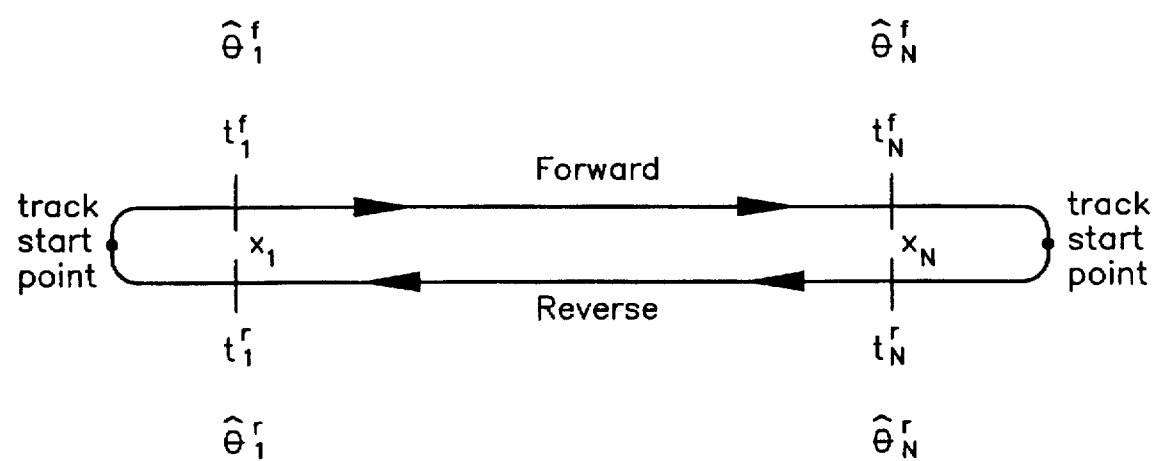
FIG. 6 is a graphical illustration used in the derivation of the backlash in each machine axis.

In addition to the average angular error characterization for the machine, it is also necessary for compensation purposes to characterize the angular deviation errors for the forward and reverse directions individually. This may be accomplished using the data over complete forward/reverse traversals and, by using a "closure" principle, an estimate of the constant component in the gyro output may be derived. (Closure requires that the net angular change around a closed traverse be zero). Application of the closure principle leads to the following relationship (refer to FIG. 6):

$$\hat{\theta}_N{}^f - \hat{\theta}_1{}^f + \hat{\theta}_1{}^r - \hat{\theta}_N{}^r - \Omega(t_N{}^f - t_1{}^f + t_1{}^r - t_N{}^r) = 0 \quad (8)$$

where $\hat{\theta}_1{}^f$ = filtered cumulative angle at the start turnaround point, with the machine moving forward $\hat{\theta}_1{}^r$ = filtered cumulative angle at the start turnaround point, with the machine moving backward $\hat{\theta}_N{}^f$ = filtered cumulative angle at the end turnaround point, with the machine moving forward $\hat{\theta}_N{}^r$ = filtered cumulative angle at the end turnaround point, with the machine moving backward $t_1{}^f$ = time at the start turnaround point, with the machine moving forward $t_1{}^r$ = time at the start turnaround point, with the machine moving backward $t_N{}^f$ = time at the end turnaround point, with the machine moving forward $t_N{}^r$ = time at the end turnaround point, with the machine moving backward $\Omega$ = unknown constant component of angular rate measured by gyro The unknown constant component in the gyro output, $\Omega$, is then easily computed from (8), which allows the forward filtered cumulative angle data to be corrected by means of $$\Delta\alpha_k{}^f = \hat{\theta}_k{}^f - \hat{\theta}_{k-1}{}^f - \Omega(t_k{}^f - t_{k-1}{}^f)$$

and the reverse filtered cumulative data to be corrected by means of $$\Delta\alpha_k{}^r = \hat{\theta}_k{}^r - \hat{\theta}_{k-1}{}^r - \Omega(t_k{}^r - t_{k-1}{}^r)$$

Given the availability of the individual estimates, $\Delta\alpha_k{}^f$ and $\Delta\alpha_k{}^r$, the total track angular deviation measured from the reference starting point is obtained separately for the forward direction of motion by means of $$\alpha_k{}^f = \alpha_{k-1}{}^f + \Delta\alpha_k{}^f \quad (9)$$

and for the reverse direction of motion by means of $$\alpha_k{}^r = \alpha_{k-1}{}^r + \Delta\alpha_k{}^r \quad (10)$$

As was the case for the average angular deviation, a best estimate based on M traversals may be obtained by averaging the individual results for both the forward and reverse directions.

Calibration of the Machine's Backlash Parameters

A complete characterization of a machine's angular errors must also include a measurement of the backlash in each axis. (Backlash is defined here as the change in the angular orientation of an axis that occurs almost instantaneously when the direction of axis travel is reversed.) The methodology used to determine the angular deviations of each axis of a machine also lends itself to determining the backlash in the axis, without requiring a special procedure dedicated to this purpose.

The computation of the backlash for a given axis assumes the following (refer to FIG. 6):

A stop and start occurs at each end of the track

The backlash manifests itself exactly the same way around each end of the track, with an angular change of the same magnitude but of opposite sign experienced in the process of starting and stopping at each end of the track, such that no net angle change accumulates over a complete round trip. (This is a different manifestation of the closure condition used earlier in deriving the constant component in the gyro output.)

The gyro output has a fixed component due to earth rate and bias that is the same for the traversal around each end of the track.

The component in the gyro output that is responsive to the track curvature will be zero around each end of the track, which will be true if the same portion of the track is used in both the forward and reverse directions at each of the two turnarounds.

The backlash may then be computed utilizing the following equations $$\Delta\theta_a = B + \Omega\Delta t_a \quad (11)$$

$$\Delta\theta_b = B + \Omega\Delta t_b \quad (12)$$

in which B is the backlash angle, and the angles $\Delta\theta_a$ and $\Delta\theta_b$ are the incremental filtered cumulative angle changes experienced during the turnarounds at the ends of the track, explicitly defined by $$\Delta\theta_a = \hat{\theta}_1{}^f - \hat{\theta}_1{}^r$$

$$\Delta\theta_b = \hat{\theta}_N{}^r - \hat{\theta}_N{}^f$$

with $\Delta t_a$ and $\Delta t_b$ being the time durations associated with the turnarounds at the two ends of the track, which are explicitly defined by $$\Delta t_a = t_1{}^f - t_1{}^r$$

$$\Delta t_b = t_N{}^r - t_N{}^f$$

where the quantities, $\hat{\theta}_1{}^f, \hat{\theta}_1{}^r, \hat{\theta}_N{}^f, \hat{\theta}_N{}^r, t_1{}^f, t_1{}^r, t_N{}^f, t_N{}^r$, and $\Omega$ are defined as before.

From (11) and (12), the unknown constant component, $\Omega$, in the gyro output is determined as $$\Omega = \frac{\Delta\theta_a + \Delta\theta_b}{\Delta t_a + \Delta t_b} \quad (13)$$

which allows the backlash, B, to be computed as $$B = \Delta\theta_a(1-r) - r\Delta\theta_b \quad (14)$$

where r is defined by $$r = \frac{\Delta t_a}{\Delta t_a + \Delta t_b}$$

Each round trip will produce an independent estimate of the backlash, with a best estimate from M such traversals being the average of the individual backlash estimates, or explicitly $$\hat{B} = \frac{1}{M} \sum_{i=1}^{M} B^{(i)} \tag{15}$$

where $\hat{B}$ is the best estimate of the backlash after M machine traversals, and $B^{(i)}$ is the backlash estimate associated with the $i^{th}$ traversal.

Calibration of the Errors in Rotary Axes

The calibration of a rotary axis of a machine tool consists of using inertial measurements to determine the error in the indicated angle of the table, as derived from an angular encoder provided as part of the machine's output. The means by which this is accomplished parallels that used in the calibration of linear axes, with repeated clockwise/counterclockwise table rotations substituting for the forward/reverse motions used in the calibration of linear axes. The procedure assumes the following:

- The table is made to rotate ±360°, with gyro data and angular encoder data being collected during the process.
- A stop and start occur at the end of each clockwise and counterclockwise rotation.
- The clockwise and counterclockwise rotations are each somewhat larger than 360°, to insure crossings of the 0° and 360° points.
- The gyro bias and scale factor are essentially constant over a ±360° table traversal.

Figure 7:
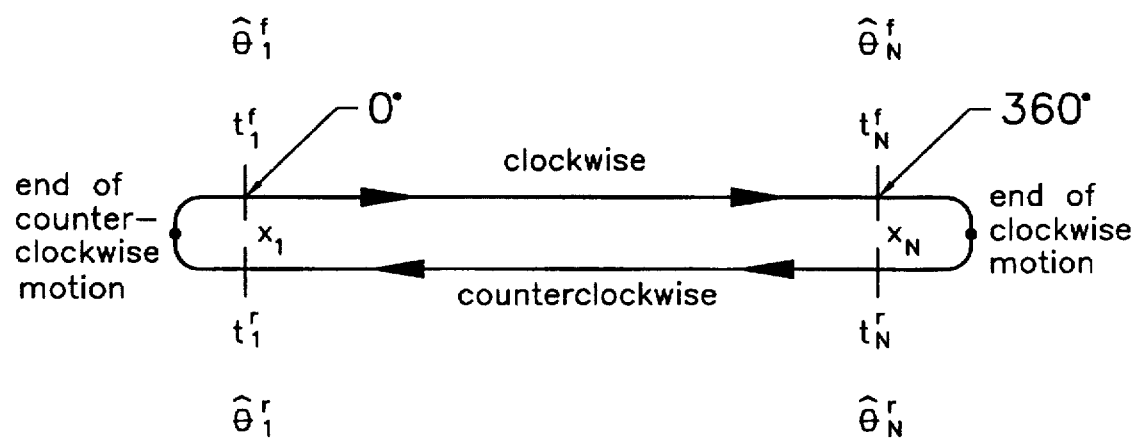
FIG. 7 is a graphical illustration used in the derivation of the angular error in a machine's rotary axis.

In order to provide an accurate calibration of the angular encoder, it is necessary to simultaneously calibrate the bias and scale factor of the gyro having its input axis along the table turn axis. This may be achieved using the table angular encoder zero reference point as a convenient fiducial mark allowing the gyro bias (actually, bias plus earth rate) and scale factor to be calibrated using data collected during precise 360° clockwise and counterclockwise rotations of the table. The processing equations are derived using a dual closure condition, which leads to the two following relationships (refer to FIG. 7):

$$\hat{\theta}_N{}^f - \hat{\theta}_1{}^f + \hat{\theta}_1{}^r - \hat{\theta}_N{}^r - \Omega(t_N{}^f - t_1{}^f + t_1{}^r - t_N{}^r) = 0 \tag{16}$$

$$\hat{\theta}_N{}^f - \hat{\theta}_1{}^f - \hat{\theta}_1{}^r + \hat{\theta}_N{}^r - 4\pi K = 0 \tag{17}$$

where $\Omega$ and K are the bias and scale factor of the gyro having its input axis along the table turn axis.

The gyro scale factor and bias are then determined directly from (16) and (17), which allows the error in the angular encoder to be determined by forming the difference between the corrected filtered cumulative incremental angle and its indicated value over each segment of the angular excursion of the table. This is accomplished for both the clockwise and counterclockwise motions of the table, yielding the following relationships $$\Delta \beta_k{}^f = \frac{1}{K} [\hat{\theta}_k{}^f - \hat{\theta}_{k-1}{}^f - \Omega(t_k{}^f - t_{k-1}{}^f)] - (x_k - x_{k-1}) \tag{18}$$

-continued $$\Delta \beta_k{}^r = \frac{1}{K} [\hat{\theta}_k{}^r - \hat{\theta}_{k-1}{}^r - \Omega(t_k{}^r - t_{k-1}{}^r)] - (x_k - x_{k-1}) \tag{19}$$

where $\Delta \beta_k{}^f$ and $\Delta \beta_k{}^r$ are the angular errors over the clockwise and counterclockwise rotations respectively, and $x_k$ designates the table angle at the end of the $k^{th}$ segment of its angular excursion.

The clockwise and counterclockwise differences are then averaged to provide the error or the $k^{th}$ segment of the table angular excursion or, explicitly $$\Delta \beta_k = \frac{1}{2}(\Delta \beta_k{}^f + \Delta \beta_k{}^r) \tag{20}$$

This allows the cumulative error in the angular encoder, $\beta_k$, measured from the 0° point to be determined by adding all of the incremental errors, which results in the following equation $$\beta_k = \beta_{k-1} + \Delta \beta_k \tag{21}$$

The estimates of the angular encoder error derived from the individual clockwise/counterclockwise rotations may be used to arrive at the best estimate from M repetitions according to $$\hat{\beta}_k = \frac{1}{M} \sum_{i=1}^{M} \beta_k^{(i)} \tag{22}$$

where $\hat{\beta}_k$ is the best estimate after M repetitions, and $\beta_k^{(i)}$ is the angular encoder error derived from the $k^{th}$ clockwise/counterclockwise rotation.

Detailed Description of an Alternate Embodiment

The alternative exists of using a sensor assembly 20 consisting of two accelerometer and a single gyro. This concept uses the two accelerometers to measure the two level (pitch and roll) angular deviations of the track, with the gyro being used to measure the vertical (yaw) angular deviation. This alternate technique assumes that the machine acceleration is either zero (cross-track direction), or precisely known by processing the machine's position data (along-track direction).

The processing algorithms required to convert the accelerometer outputs occurring over multiple machine traversals into angular deviations are based on the structure given in FIG. 3. The cumulative angle, $\theta_k$, may be obtained directly from the accelerometer, as opposed to accumulating the gyro $\Delta\theta$'s, according to $$\theta_k = \frac{A_k}{g} - \ddot{x}_k \tag{23}$$

where $A_k$=acceleration measured by the accelerometer at the $k^{th}$ point on the track $\ddot{x}$=track acceleration derived from track position at the $k^{th}$ point on the track g=is the acceleration due to gravity Equation (23) is generalized so that it may be applied to either the along-track direction, or the cross-track direction (in which case, $\ddot{x}_k$=0).

The cumulative angle derived directly from the accelerometer is then passed through the matched filter 38 to arrive at the filtered cumulative angle, $\hat{\theta}_k$. The filtered cumulative angle is then treated in the subsequent operations illustrated in FIG. 3 in a manner indistinguishable from the treatment of the same angle derived from the gyro.

The angle, $\theta_k$, appearing in (23) has a somewhat different meaning than the similarity designated cumulative gyro incremental angle, insofar as the former is a measure of the absolute angle, whereas the latter is the angle accumulated starting from a zero initial value. Since only the change in $\theta_k$ across successive segments of the track actually appears in the processing equations, the two angles may be used without distinction. In some implementations, the acceleration required in (23) may not be directly available from the accelerometer but, rather, the natural output of the instrument may be a stream of incremental velocities. When such is the case, the needed acceleration may be derived by summing the incremental velocities over some finite time interval, and then dividing by the duration of the interval.

Detailed Description of Second Alternate Embodiment

The use of measurements obtained from a sensor assembly consisting of a triad of inertial sensors, in combination with the position measurements available from the machine, is capable of producing a highly accurate calibration of the angular errors in machine tools; however, a bad calibration resulting from the use of a failed or degraded sensor is still a distinct possibility. To prevent a bad calibration from subsequently causing a high-value part to be ruined, a sensor health monitor scheme may be employed.

The failure or degradation of a sensor in the triad may be monitored by adding a fourth gyro, whose input axis is skewed relative to the three orthogonal sensors. Assume as an example that the fourth gyro is along the diagonal of the cube formed by the input axes of the three orthogonal sensors; then, the incremental angle sensed by the skewed gyro is related to the incremental angles occurring about the three orthogonal axes as follows:

$$\Delta\theta_s = \frac{1}{\sqrt{3}} (\Delta\theta_x + \Delta\theta_y + \Delta\theta_z) \quad (24)$$

where $\Delta\theta_x$, $\Delta\theta_y$, $\Delta\theta_z$ = incremental angles about the three orthogonal axes $\Delta\theta_s$ = incremental angle sensed by the skewed gyro The relationship given by (24) establishes a parity relationship that provides the means of detecting a failure or degradation in any of the four sensors.

As applied to machine tool calibration, a unique use of the parity relationship may be made; that is, a parity signal may be formed from the four angular deviations computed from the individual sensors, as follows $$p_k = \epsilon_k - \frac{1}{\sqrt{3}} (\alpha_k + \beta_k + \gamma_k) \quad (25)$$

where $p_k$ = parity at the $k^{th}$ point on the track (nominally zero for perfect sensors)

$\alpha_k$ = angular deviation at $k^{th}$ point on track determined by the along-track sensor $\beta_k$ = angular deviation at $k^{th}$ point on track determined by the cross-track sensor $\gamma_k$ = angular deviation at $k^{th}$ point on track determined by the vertical gyro $\epsilon_k$ = angular deviation at $k^{th}$ point on track determined by the skewed gyro Therefore, any sensor failure or major degradation may be detected by testing the value of $p_k$, and verifying that it remains within bounds that are reasonable for normally encountered fixed and random sensor errors.

In addition, the accuracy of the pitch, roll, and yaw angular deviations may be enhanced by using all four angular deviation functions. This is achieved by employing a least-squares solution that derives the three angular deviations about the orthogonal axes from the four available angular deviation functions, using the following equation $$\begin{bmatrix} \alpha_k^* \\ \beta_k^* \\ \gamma_k^* \end{bmatrix} = (A^TA)^{-1}A^T \begin{bmatrix} \alpha_k \\ \beta_k \\ \gamma_k \\ \epsilon_k \end{bmatrix} \quad (26)$$

where the matrix A is defined for the example sensor configuration by $$A = \begin{bmatrix} 1 & 0 & 0 \\ 0 & 1 & 0 \\ 0 & 0 & 1 \\ \frac{1}{\sqrt{3}} & \frac{1}{\sqrt{3}} & \frac{1}{\sqrt{3}} \end{bmatrix}$$

and $\alpha_k^*$, $\beta_k^*$, and $\gamma_k^*$ are the angular deviations (pitch, roll, yaw) about the three orthogonal machine axes, with $\alpha_k$, $\beta_k$, $\gamma_k$ and $\epsilon_k$ being the angular deviations determined from the three orthogonal and skewed sensor outputs.

The embodiments of an invention in which an exclusive property or right is aimed are defined as follows:

1. A device for calibrating a precision machining tool to determine the pitch, roll and yaw angular deviations of a movable member of the machining tool relative to a fixed machine base of the machining tool, the device comprising:

a movable member associated with the machining tool for moving a workpiece relative to the cutting tool, the movable member having a full range of motion a sensor assembly attached to the movable member and responsive to motion along three orthogonal axes, the sensor assembly providing an output indicative of sensed yaw motion, sensed pitch motion, and sensed roll motion;

a position sensor attached to the movable member for producing a position output indicative of the position of the movable member relative to a predetermined starting point; and a processing unit attached to the sensor assembly output and the position output for collecting data as the movable member is exercised through its full range of motion and for calculating an angle deviation as a function of the movable member's position relative to the starting point.

2. The device of claim 1 wherein the sensor assembly comprises three gyroscopes with their input axis arranged orthogonally.

3. The device of claim 1 wherein the sensor assembly comprises four gyroscopes, the first three gyroscope arranged having their input axis orthogonal to one another, and the fourth gyroscope arranged to have its input axis such that it senses a component of the rotation sensed by the first three gyroscopes.

4. The device of claim 1 wherein the sensor assembly comprises one gyroscope and at least two accelerometers, all having their input axis arranged orthogonally.

5. The device of claim 1 wherein the movable member is a table having a linear translation range of motion.

6. The device of claim 1 wherein the movable member is a rotation platform having a rotary range of motion.

7. The devices of claim 1 wherein the processing unit has a first filtering means and a second filtering means, the first filtering means attached to the sensor assembly output having a first filter means output, the first filtering means for filtering noise according to a predetermined filtering function and producing a filtered angle signal at the first filter means output, the second filtering means attached to the position output having a second filter means output, the second filtering means for filtering noise according to the predetermined filtering function and producing a filtered position signal at the second filter means output.

8. The device of claim 7 wherein the processing unit receives data as the movable member is exercised through its range of motion in both a positive direction and a negative direction.

9. The device of claim 8 wherein the processing unit divides the range of motion into a plurality of equal segments and determines angular deviation for each of the plurality of segments.

10. The device of claim 9 wherein the processing unit further includes an angle sorting means which receives the filtered angle signal and the filtered position signal and creates a set of angle data including the filtered angle signal and the filtered position signal for each of the segments of the range of motion.

11. The device of claim 10 wherein the processing unit includes data compilation means for determining the two sets of angle data corresponding to a single segment for both positive and negative motion, adding the angle data and dividing the result by two thereby resulting in a true angle deviation for the given segment free from and error terms.

12. The device of claim 11 wherein the processing unit accumulates all true angle deviations for all segments of the range of motion resulting in the angle deviation as a function of the movable member's position relative to the starting point.

13. A calibration apparatus for detecting the pitch, roll and yaw angular deviations in the movement of a table as it translates down a track of a numerically controlled machine tool relative to a fixed machine base of the machine tool thus providing a correction function to allow for compensation of these angular deviations, the calibration apparatus comprising:

a sensor assembly attached to the table for detecting inertial motion of the table as it traverses the track, said sensor assembly having an inertial sensor output;

a position encoder attached to the machine tool for determining the position of the table relative to the machine tool, the position encoder having a position output;

summing means attached to the inertial sensor output for receiving data and summing it over a period of time to produce a cumulative sensor output;

first filtering means attached to the summing means for receiving the cumulative sensor output and producing a filtered sensor output, wherein the filtering means eliminates noise according to a predetermined filter function;

second filtering means attached to the position encoder for receiving the position output and producing a filtered position output, wherein the filtering means eliminates noise according to the predetermined filter function; and processor means having a control output attached to the sensor assembly and the position encoder for coordinating the operation of the sensor assembly and the position encoder so as to trigger the reading of a plurality of sets of sensor readings and position readings and consequently a plurality of sets of filtered position outputs and filtered sensor outputs, wherein the processor means also accumulates the plurality of sets of filtered position outputs and plurality of sensor outputs and produces a cumulative set of position versus inertial motion data for an entire traversal of the track.

14. The calibration apparatus of claim 13 wherein the sensor assembly includes a triad of gyroscopes each having their input axis orthogonally aligned.

15. The calibration apparatus of claim 14 wherein data is accumulated through a complete round trip of the table including forward motion and reverse motion.

16. The calibration apparatus of claim 15 wherein the forward motion and the reverse motion are symmetrical.

17. The calibration apparatus of claim 16 wherein the round trip is divided into a plurality of segments, each segment representing a portion of track.

18. The calibration apparatus of claim 17 wherein the processor means coordinates the filtered position outputs and filtered sensor outputs so as to determine the filtered sensor output for each segment of the track.

19. The calibration apparatus of claim 18 wherein the filtered sensor outputs for the forward motion and the filtered sensor output for the reverse motion corresponding to a segment of track are added together and divided by two to determine the true angular deviation of the table relative to the fixed machine base for that segment of track.

20. A method of determining pitch, roll and yaw angular deviation in the movement of a movable member of a numerically controlled precision machining tool relative to a fixed machine base of the machining tool, the method comprising the steps of:

exercising the movable member of the numerically controlled precision machining tool through its full range of motion in both a forward and reverse direction;

accumulating sensor data from an inertial sensor assembly attached to the movable member while the movable member is exercised;

accumulating position data from a position encoder attached to the movable member wherein the position encoder provides a signal indicative of the position of the movable member relative to a predetermined starting point;

partitioning the movable member's range of motion into a plurality of segments such that each segment represents a portion of the full range of motion;

identifying the data from the inertial sensor assembly that corresponds to each segment, wherein the data corresponding to each segment will include forward data from the forward motion of the movable member and reverse data from the reverse motion of the movable member; and processing the identified data for each segment to determine the angular deviation of the movable member relative to the fixed machine base for that segment, wherein the processing includes the steps of adding the forward data and the reverse data for each segment to determine a true angular deviation for that segment free of any constant error terms, and accumulating the true angular deviation for all the segments to determine an angular deviation function for the entire range of motion of the movable member.

21. The method of claim 20 further comprising the steps of:

filtering the sensor data before processing so as to eliminate noise according to a predetermined filtering function; and filtering the position data before processing so as to eliminate noise according to a predetermined filtering function.

22. The method of claim 20 wherein the step of exercising the movable member is done such that the forward motion and the reverse motion are symmetrical relative to a predetermined reference point.

23. The method of claim 20 further comprising the step of processing the identified data to determine backlash within the machining tool.

* * * * *

UNITED STATES PATENT AND TRADEMARK OFFICE
Certificate

Patent No. 5,834,623                                              Patented: November 10, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Mario B. Ignagni, Ramsey, MN; and William P. Platt, Minneapolis, MN.

Signed and Sealed this Thirteenth Day of July, 1999.

*HEZRON E. WILLIAMS*
*Supervisory Patent Examiner*
Art Unit 2856